(12) United States Patent
Tsuji

(10) Patent No.: US 6,585,067 B2
(45) Date of Patent: Jul. 1, 2003

(54) CONTROL DEVICE FOR SADDLE TYPE VEHICLE

(75) Inventor: Mitsuru Tsuji, Shuuchi-gun (JP)

(73) Assignee: Kabushiki Kaisha Moric, Shuuchi-gun (JP)

(*) Notice: Subject to any disclaimer, the term of this patent is extended or adjusted under 35 U.S.C. 154(b) by 8 days.

(21) Appl. No.: 09/681,699

(22) Filed: May 23, 2001

(65) Prior Publication Data

US 2002/0007976 A1 Jan. 24, 2002

(30) Foreign Application Priority Data

May 30, 2000 (JP) .................................... 2000-161290

(51) Int. Cl.[7] .............................. B62D 25/14; B62J 39/00
(52) U.S. Cl. ............................ 180/90; 180/219; 296/70
(58) Field of Search ............... 180/90, 219, 220; 280/288.4, 263; 74/551.1, 551.8; 73/866.3; 296/70; 200/61.54; 340/461

(56) References Cited

U.S. PATENT DOCUMENTS

| | | | | | |
|---|---|---|---|---|---|
| 4,687,072 A | * | 8/1987 | Komuro | ..................... | 180/219 |
| 4,710,599 A | * | 12/1987 | Motodate et al. | ........ | 200/61.85 |
| 4,796,716 A | * | 1/1989 | Masuda | ...................... | 180/176 |
| 5,594,411 A | * | 1/1997 | Ono | ......................... | 340/425.5 |
| 6,225,584 B1 | * | 5/2001 | Ase et al. | ................ | 200/61.54 |
| 6,344,621 B1 | * | 2/2002 | Shiratori et al. | ......... | 200/61.54 |

* cited by examiner

Primary Examiner—Paul N. Dickson
Assistant Examiner—David R. Dunn
(74) Attorney, Agent, or Firm—Ernest A Beutler

(57) ABSTRACT

An improved meter display device and control device for a saddle type vehicle such as a motor scooter. The display is mounted in the handlebar cover and in addition to the mounting the display, certain engine control parts are also mounted in the same housing so as to make a neater installation and simplify the overall construction.

5 Claims, 6 Drawing Sheets

CONTROL DEVICE FOR SADDLE TYPE VEHICLE

BACKGROUND OF INVENTION

This invention relates to a control device for a saddle type vehicle and more particularly to an improved arrangement for mounting the controls and displays for scooter type vehicles.

A very popular type of vehicle is of the type that has a saddle type seat on which the rider sits with his feet depending below the seat and generally forwardly of them. A handlebar assembly is disposed forwardly of the seat for control of the vehicle by the rider. A typical example of this type of vehicle is a motor scooter.

It is generally the practice to provide some form of display forwardly of the rider"s seat and generally in proximity to the handlebar to display certain vehicle operational conditions such as vehicle speed or engine speed. These displays comprise a visual display and a driver for the visual display, which may be mounted in the same housing forwardly of the rider and in proximity to the handlebar and a sensor for providing the necessary information to the display.

The sensor obviously is mounted remotely from the display and the display driver and their mounting arrangement. Often times the same sensor or other sensors may be embodied on the vehicle for controlling operations of the vehicle. For example, it is frequently the practice to employ a crank angle sensor that operates with the ignition system for controlling the firing of the spark plug or spark plugs at predetermined preferred crankshaft angles. These sensors and their associated control arrangements are mounted at various locations on the vehicle body and thus, further complicate the structure and can give rise to difficulties in mounting the components and transmitting signals between the sensors and the controls and any associated displays.

It is, therefore, a principal object to this invention to provide an improved control device for this type of vehicle.

It is a further object to this invention to provide a control device for this type of vehicle wherein the control devices may be mounted in proximity to the sensors so as to communize the mounting and minimize the amount of wiring required. Additionally this will make the overall construction neater and more compact.

SUMMARY OF INVENTION

This invention is adapted to be embodied in a vehicle having a seat upon which a rider is seated with his feet extending forwardly and downwardly. A handlebar assembly is provided in front of the seat and of the vehicle for steering the vehicle in its path of movement. A base plate is associated with the handlebar and supports a meter display. A sensor is mounted on the vehicle in spaced relationship to the meter display. A meter control is directly mounted on the base place and in communication with the sensor for displaying vehicle information on the meter display. A running control for controlling a running drive of the vehicle is also mounted on the base plate.

DETAILED DESCRIPTION

Figure 1:
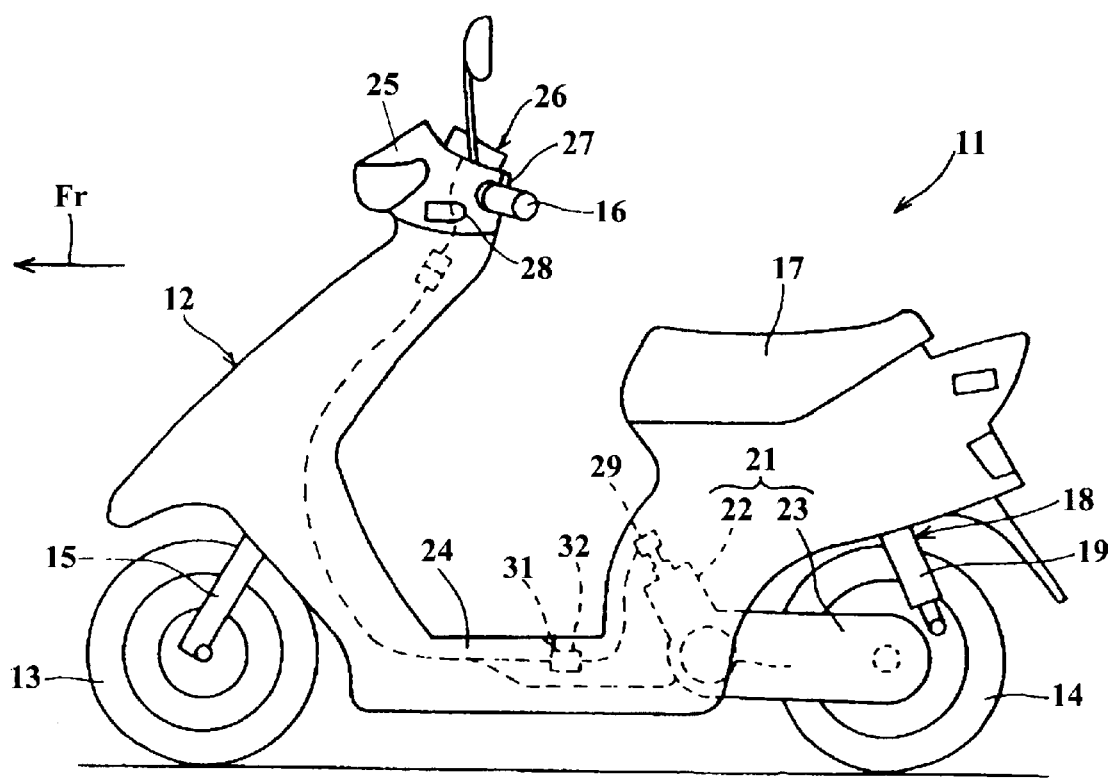
FIG. 1 is a side elevational view of a saddle type vehicle constructed in accordance with an embodiment of the invention.

Referring first to FIG. 1, a motor scooter constructed in accordance with an embodiment of the invention is identified generally by the reference numeral 11. The motor scooter 11 includes a main body portion, indicated generally by the reference numeral 12, from which a front wheel 13 and rear wheel 14 are suspended. The front wheel 13 is dirigibly supported by the main body portion 12 in a known manner by means that includes a front fork 15 that is steered by a handlebar assembly 16.

The rear wheel 14 underlies a rider"s seat 17 and is journalled by a suspension system, indicated generally by the reference numeral 18 and which includes a rear shock absorber 19. An engine transmission assembly, indicated generally by the reference numeral 21 consists of an internal combustion engine 22 and a transmission 23 that drives the rear wheel 14. This engine transmission assembly 21 is pivotally mounted on the main body portion 12 by the suspension system 18 in a suitable manner for accommodating the suspension movement of the rear wheel 14.

A foot area 24 is formed by the main body portion 12 forwardly of the seat 17 so that a rider seated on the seat may place his feet on the foot area 24.

A front cover 25 is mounted above and around the handlebar assembly 16 and supports certain components. These components include a combined control box and display, indicated generally by the reference numeral 26, a main switch 27 and a pair of turn signal flashers 28.

Figure 2:
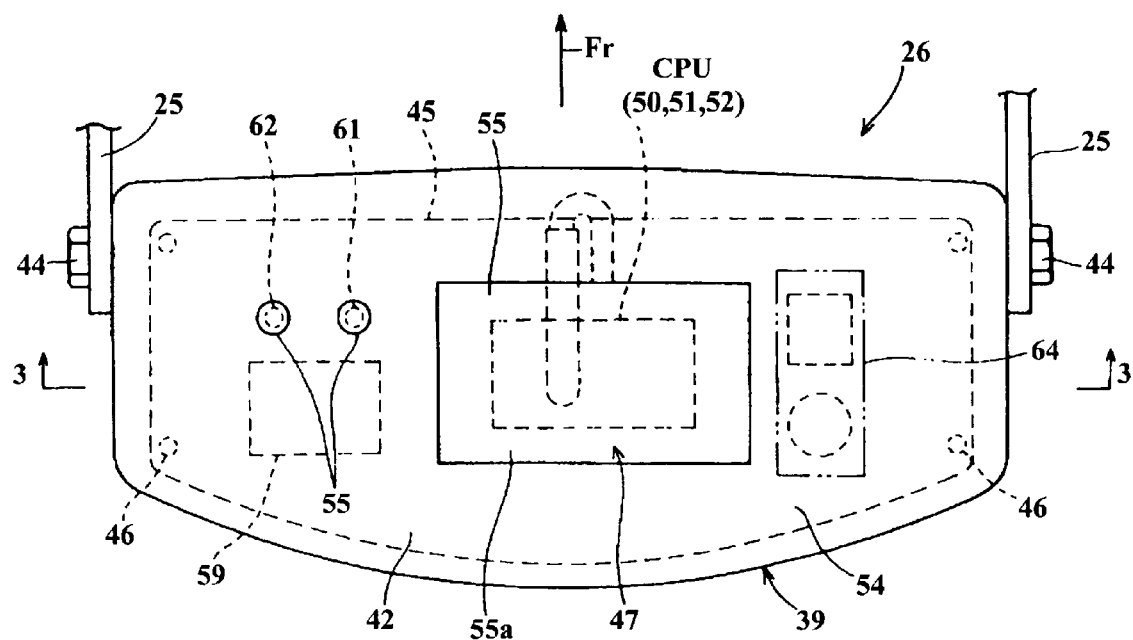
FIG. 2 is an enlarged top plan view showing the vehicle display.
Figure 3:
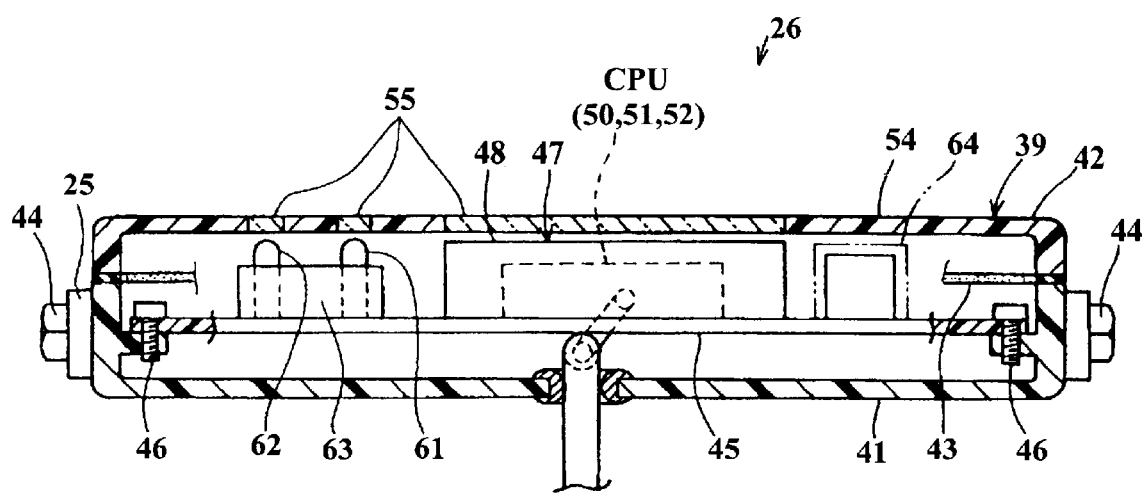
FIG. 3 is a cross sectional view of the meter display taken along the line 3—3 of FIG. 2.

The combined control box and display 26 is shown in more detail in FIGS. 2 and 3 and will be described in more detail shortly by reference thereto. This combined control box and display 26 also is shown in the schematic view in FIG. 4 and is indicated by the dot dash lines therein so as to indicate the mounting of various components.

Figure 4:
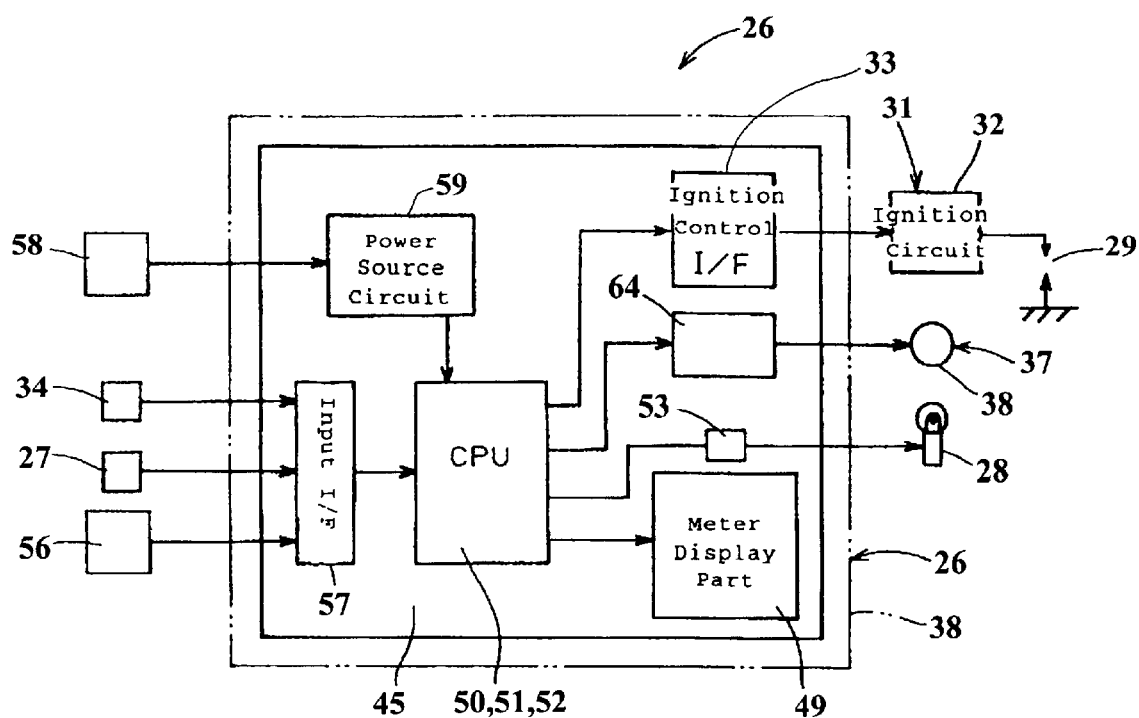
FIG. 4 is a schematic view showing the components associated with the display and the control for certain functions of the vehicle.

Referring now primarily to FIGS. 1 and 4, the engine 22 is provided with certain control components and, except for those, which will be described, it should be understood that the remainder of the construction of the engine 22 is conventional. Those engine control units, which are associated in conjunction with the invention, comprise a spark plug 29 that is fired by an ignition system, shown schematically in FIG. 1 and indicated generally by the reference numeral 31.

This ignition system 31 includes a firing circuit 32 which may be mounted conveniently on the vehicle body 12, for example under the foot area 24. This controls the firing of the spark plug 29 in accordance with a desired control strategy that is supplied by an ignition control interface 33 (FIG. 4), which is mounted, in a manner to be described, in the combined control and display 26.

A crank angle detector of a known type, shown schematically at 34 in FIG. 4, senses the rotational angle of the crankshaft of the engine 22 and outputs this signal to the ignition control interface 33, in a manner, which will be described in more detail shortly. For example, this crank angle detector or sensor 34 may cooperate with a flywheel magneto of the engine, which appears schematically in FIG. 1.

The engine is also provided with a lubricating system, which is indicated generally by the reference numeral 37 in FIG. 4 and which includes a lubricant pump 38, which is controlled in a manner to be described.

Referring now in detail primarily to FIGS. 2 through 4, the combined control box and display 26 will be described in more detail. It is comprised of a main housing assembly 39 that is formed from a plastic material comprised of a lower support plate 41 and a cover plate 42 that is detachably affixed thereto with an intermediate gasket 43. This connection may be made in any suitable manner and preferably one, which will permit access to the interior of the main housing assembly 39.

The lower support plate 41 is supported on the front cover 25 by means of threaded fasteners 44. Within the body of the main housing assembly 39, there is mounted a base plate 45 that is connected to an inwardly extending flange of the lower support plate 41 by threaded fasteners 46.

A number of driver components are mounted on the base plate 45, which, preferably, is formed from an insulating material. These components include a main meter display 47 that has an upper display surface 48 and which contains a plurality of display functions for the display part, indicated generally by the reference numeral 49 in FIG. 4, of the combined control box and display 26. This includes a CPU, shown schematically in FIG. 4; that has sections for controlling the firing circuit 32 via the ignition control interface 33; a lubricating control driver, indicated generally by the reference numeral 51, for operating the lubricating pump 38; a flasher control driver 52 for operating a flasher unit 53 (FIGS. 3 and 4) for operating the flashers 28; and a meter control driver, indicated generally by the reference numeral 50, for controlling the display on the upper display surface 48.

The upper housing piece or cover plate 42 is provided with an opaque upper surface 54 and a series of translucent parts 55. One of these parts 55 overlies the display face, this being indicated at 55A.

The upper display surface 48 can supply indication of various conditions from sensors including the crank angle detector 34. These other sensors are indicated by the box 56 in FIG. 4 and sense certain conditions such as vehicle speed, liquid level for the lubricating oil and fuel and water temperature, et cetera.

These signals are transferred to an input/output interface 57 that in turns transmits the information to the CPU including the drivers 50, 51 and 52 of the CPU. The main switch 27 also is connected to the input/output interface 57.

A battery, shown schematically at 58 in FIG. 4, inputs electrical signal to a power source circuit 59 mounted in the main housing assembly 39 and that supplies power to the CPU and other components as shown schematically in FIG. 4.

Finally, there are provided a pair of further small translucent parts 55 that overlie LEDS such as an over speed LED 61 and a low fuel level LED 62 that are controlled by the suitable control 63 that receives signals from appropriate sensors on the vehicle body.

A driver 64 for the lubricating pump 38 also is contained in the main housing assembly 39. This driver is operated by the lubricant control 51 of the CPU.

As should be apparent from the foregoing description, this arrangement is very effective in locating components that receive outputs from the same sensors, all within the combined control box and display 26 and thus providing a much more compact and neater assembly. This also reduces the number of wiring harnesses that are required and also places the components in a position where servicing is facilitated.

Figure 5:
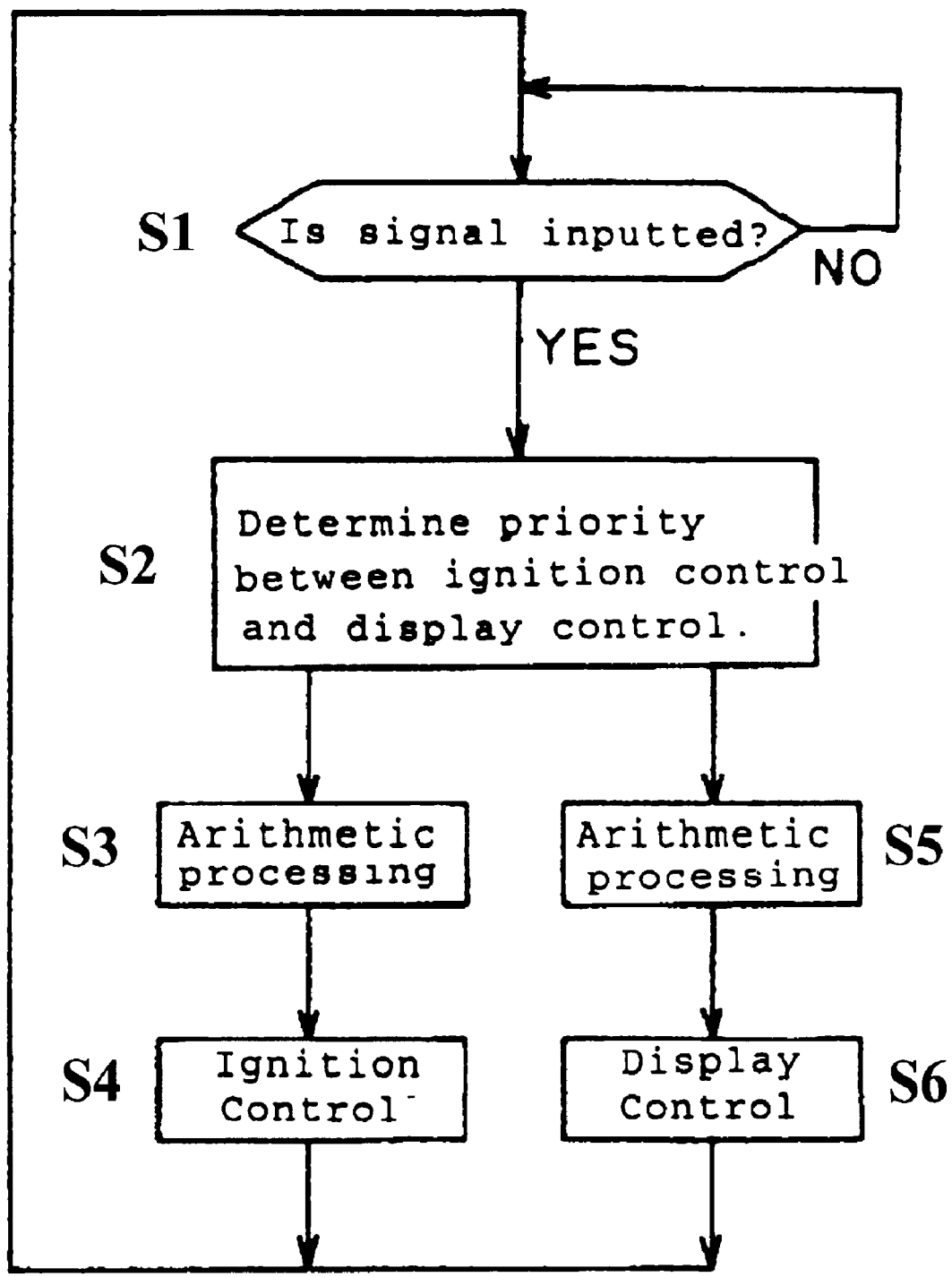
FIG. 5 is a block diagram showing the sequence of operation of the display and vehicle control.

FIG. 5 is a flow chart that shows how the various devices including the control parts 50, 51 and 52 are operated. As seen in FIG. 5, the program starts at the step S1 to determine if a signal is outputted from one of the detectors such as the specific ignition timing detector 34.

If it is outputting a signal, then the program moves to the step 52 to determine the priority between the ignition control and the display control. The program prefers the ignition control if a change is required and if so, it moves to the step S3 to perform the arithmetic processing and to the step S4 so as to output the appropriate signal to the ignition control interface 33 to switch the firing circuit 32 to fire the spark plug 29.

Then, the program moves to the step S5 to perform the arithmetic processing necessary to project the engine speed signal at the step S6.

In the illustrated embodiment, the outer housing pieces are detachably connected to each other. However, it is to be understood that that can be ultrasonically bonded to form a unitary housing assembly.

Figure 6:
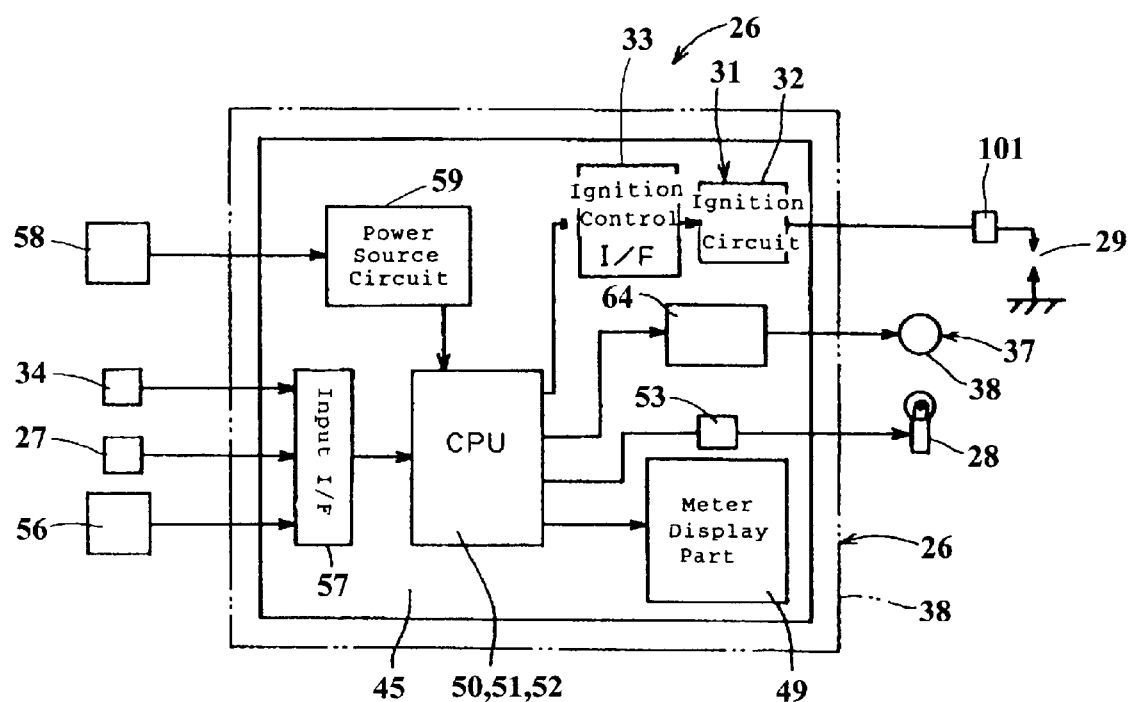
FIG. 6 is a schematic view, in part similar to FIG. 4, and shows another embodiment of the invention.

FIG. 6 shows another embodiment and this embodiment differs from the previous one only in the fact that the ignition circuit is embodied in the combined control box and display 26 and is separated from a separate firing coil, indicated by the reference numeral 101 and which is externally positioned on the vehicle body 12 in proximity to the spark plug 29 for its firing. In all other regards, this embodiment is the same as that previously described.

Thus, from the foregoing description it should be readily apparent that the described construction provides a very compact and effective meter arrangement for a small vehicle such as a motor scooter wherein both the display of vehicle and engine conditions and control of the engine operation are simplified by placing the controls in the display unit where they can be protected and also be easily serviced. Of course, the foregoing description is that of a preferred embodiment of the invention and various changes and modifications may be made without departing from the spirit and scope of the invention, as defined by the appended claims.

What is claimed is:

1. A vehicle having a seat upon which a rider is seated with his feet extending forwardly and downwardly, a handlebar assembly at the front of said seat and said vehicle for steering of said vehicle in its path of movement, a combined control box and display carried by said handlebar assembly and supporting a meter display viewable from within said combined control box and display, a base plate contained within said combined control box and display a sensor mounted on said vehicle in spaced relation to said meter display, a meter control mounted directly on said base plate and in communication with said sensor for displaying vehicle information on said meter display, and an engine system control for controlling an engine system for an engine driving said vehicle, said engine system control being mounted within said combined control box and display on said base plate.

2. A vehicle as set faith in claim 1 wherein the engine system control comprises a control for an ignition system for the engine.

3. A vehicle having a seat upon which a rider is seated with his feet extending forwardly and downwardly, a handlebar assembly at the front of said seat and said vehicle for steering of said vehicle in its path of movement, a base plate associated with said handlebar assembly and supporting a meter display, a sensor mounted on said vehicle in spaced relation to said meter display, a meter control mounted directly on said base plate for displaying vehicle information on said meter display, and a running control for controlling a running drive of said vehicle mounted on said base plate, said sensor supplying information to both the meter control and the running control.

4. A vehicle having a seat upon which a rider is seated with his feet extending forwardly and downwardly, a handlebar assembly at the front of said seat and said vehicle for steering of said vehicle in its path of movement, a base plate associated with said handlebar assembly and supporting a meter display, a sensor mounted on said vehicle in spaced relation to said meter display, a meter control mounted directly on said base plate and in communication with said sensor for displaying vehicle information on said meter display, and a running control for controlling an ignition system for an engine powering said vehicle mounted on said base plate, said running control for said ignition system comprises a firing circuit for supplying a charge to an ignition coil.

5. A vehicle as set forth in claim 4 wherein the ignition coil is mounted on the vehicle apart from the base plate.

\* \* \* \* \*